(12) United States Patent
Ho et al.

(10) Patent No.: US 10,509,184 B2
(45) Date of Patent: Dec. 17, 2019

(54) WELDING ASSEMBLY FOR COUPLING A TRANSMITTER OPTICAL SUBASSEMBLY (TOSA) MODULE TO AN OPTICAL TRANSMITTER OR TRANSCEIVER

(71) Applicant: Applied Optoelectronics, Inc., Sugar Land, TX (US)

(72) Inventors: I-Lung Ho, Sugar Land, TX (US); Hsiu-Che Wang, Rosenberg, TX (US); Hao-Hsiang Liao, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 98 days.

(21) Appl. No.: 15/473,563

(22) Filed: Mar. 29, 2017

(65) Prior Publication Data

US 2018/0284370 A1 Oct. 4, 2018

(51) Int. Cl.
*G02B 6/42* (2006.01)
*G02B 6/12* (2006.01)

(52) U.S. Cl.
CPC ......... *G02B 6/4237* (2013.01); *G02B 6/4245* (2013.01); *G02B 6/12009* (2013.01); *G02B 6/423* (2013.01); *G02B 6/4215* (2013.01); *G02B 6/4225* (2013.01); *G02B 6/4234* (2013.01); *G02B 6/4246* (2013.01); *G02B 6/4256* (2013.01); *G02B 6/4266* (2013.01); *G02B 6/4281* (2013.01); *G02B 6/4292* (2013.01)

(58) Field of Classification Search
CPC .. G02B 6/4237; G02B 6/4245; G02B 6/4225; G02B 6/423; G02B 6/4234; G02B 6/4246
See application file for complete search history.

(56) References Cited

U.S. PATENT DOCUMENTS

| 2005/0007741 A1* | 1/2005 | Ice | ...................... G02B 6/4201 361/704 |
| 2006/0032665 A1* | 2/2006 | Ice | ........................ H05K 1/028 174/254 |

* cited by examiner

*Primary Examiner* — Sung H Pak
*Assistant Examiner* — Hoang Q Tran
(74) *Attorney, Agent, or Firm* — Grossman Tucker Perreault & Pflegar, PLLC; Norman S. Kinsella

(57) ABSTRACT

In accordance with an embodiment, a welding assembly is disclosed that allows for a laser assembly to be coupled into a socket of the same and held at a fixed position, e.g., by a mechanical grabber of a welding system. The mechanical grabber may then travel along one or more axis to bring the TOSA module into mechanical alignment with an opening of an associated optical subassembly housing. The welding assembly may further include an alignment member that provides one or more alignment contact surfaces configured to be brought directly into contact with a surface of the associated subassembly housing. When the one or more alignment contact surfaces are "flush" with the surface of the subassembly housing the emission face of the TOSA module is substantially parallel, and by extension, optically aligned with the opening of the associated subassembly housing.

15 Claims, 11 Drawing Sheets

WELDING ASSEMBLY FOR COUPLING A TRANSMITTER OPTICAL SUBASSEMBLY (TOSA) MODULE TO AN OPTICAL TRANSMITTER OR TRANSCEIVER

CROSS-REFERENCE TO RELATED APPLICATIONS

This Application is related to co-pending U.S. application Ser. No. 15/334,753 titled "Transmitter Optical Subassembly (TOSA) Module With Integrated Welding Member For Use in Optical Transmitters or Transceivers" filed on Oct. 26, 2016, which is incorporated by reference herein in its entirety.

TECHNICAL FIELD

The present disclosure relates to optical transmitters and transceivers, and more particularly, to a welding assembly for coupling a laser package to an optical transmitter or transceiver.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver.

BRIEF DESCRIPTION OF THE DRAWINGS

These and other features and advantages will be better understood by reading the following detailed description, taken together with the drawings wherein.

DETAILED DESCRIPTION

Figure 1:
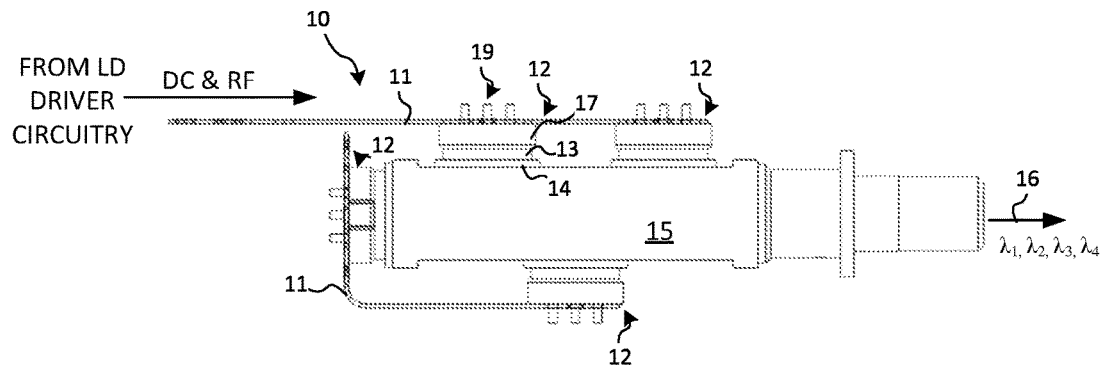
FIG. 1 is a side view of a multi-channel transmitter optical sub-assembly (TOSA)

Increased demand for high-speed optical transceivers, largely due to the adoption of network standards such as IEEE 802.3bm-2015 and others that prescribe 100 Gigabit Ethernet (100 GbE) and beyond, raises non-trivial challenges in the design of optical subassembly modules. For example, in multi-channel transmitter optical subassemblies (TOSAs) multiple optical component assemblies such as TO can laser assemblies may be coupled to openings of a TOSA housing to generate associated channel wavelengths. FIG. 1 shows one such example TOSA 10 having a plurality of TO can laser packages 12. Each of the TO can laser packages 12 emit light into the TOSA housing 15, with the TOSA housing 15 having an optical arrangement to combine channel wavelengths into an output wavelength division multiplexed (WDM) signal 16 for output via a waveguide or other device such as a fiber. Each of the TO can laser packages 12 may include a laser diode and associated optics (not shown) disposed in a hermetically or non-hermetically sealed package 17, or TO can header 17. Pins 19 of each TO can laser package 12 electrically couple to laser diode (LD) driver circuitry via flexible printed circuit boards (FPCs) 11 to receive power (e.g., direct current DC) and radio frequency (RF) signals.

To couple to the TOSA housing 15, each TO can laser package 12 includes a separate welding cap 13. During manufacturing, the welding cap 13 may be coupled to the TO can header 17, e.g., via welding, adhesive or other suitable approach. The welding cap 13 may then be welded to the TOSA housing 15 via welding ring 14, and "hammered" or otherwise adjusted during alignment procedures to ensure nominal optical performance of each TO can laser package 12. As optical transceiver modules continue to scale (e.g., to comport with small form-factor (SFF) standards and requirements), the reduced tolerances make attachment and alignment of such multi-piece TO can laser packages 12 more complex and error prone. For example, the TOSA 10 shown in FIG. 1 may measure 10 millimeters, or less, in length from end to end. Existing attachment and alignment approaches at this scale are often error prone and can ultimately reduce yield. Optical misalignments in the tens of microns may adversely affect optical transmitter/transceiver performance.

Thus, in accordance with an embodiment of the present disclosure, a welding assembly (or welding fixture) is disclosed that allows for a TOSA module, which may also be referred to as a laser assembly, to be coupled into a socket of the same and held at a fixed position. During manufacture of an optical transmitter/transceiver, a mechanical grabber can grip the welding assembly and travel along one or more axis to bring the TOSA module into alignment with an associated opening of an optical subassembly housing. The welding assembly includes an alignment member (which may also be referred to as an alignment cap) configured to couple to an optical coupling end of the TOSA module, with the alignment member providing one or more alignment contact surfaces configured to be brought directly in contact with a surface of the subassembly housing. The one or more alignment contact surfaces may extend substantially parallel with an emission face (e.g., the output face of a laser diode) of the TOSA module. Thus, when the one or more alignment contact surfaces are "flush" with the surface of the subassembly housing the emission face of the TOSA module is substantially parallel with the associated opening of the subassembly housing. The alignment member may then be removed and subsequent active alignment processes (e.g., using laser hammering) may be performed to ensure nominal optical performance. The welding assembly may provide temporary electrical coupling between the TOSA module and driver circuitry during active alignment processes. For example, the welding assembly may be temporarily electrically coupled to the TOSA module and also electrically coupled to the welding system via a flexible printed circuit board (FPCB) or other suitable interconnect device.

In an embodiment, the TOSA module may be implemented as the TOSA module disclosed in greater detail in the co-pending U.S. application Ser. No. 15/334,753 titled "Transmitter Optical Subassembly (TOSA) Module With Integrated Welding Member For Use in Optical Transmitters or Transceivers" filed on Oct. 26, 2016, which is incorporated by reference herein in its entirety.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T coarse wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly optically coupled" as used herein refers any optical connection that allows light to be imparted from one element to another without the use of an intermediate device such as a fiber. As used herein, "directly aligned" refers to an alignment between optical components that allows light to pass from one optical component to another optical component without changing the linear path of the light, for example, without using an optical fiber.

Example Optical Transceiver System

Figure 2:
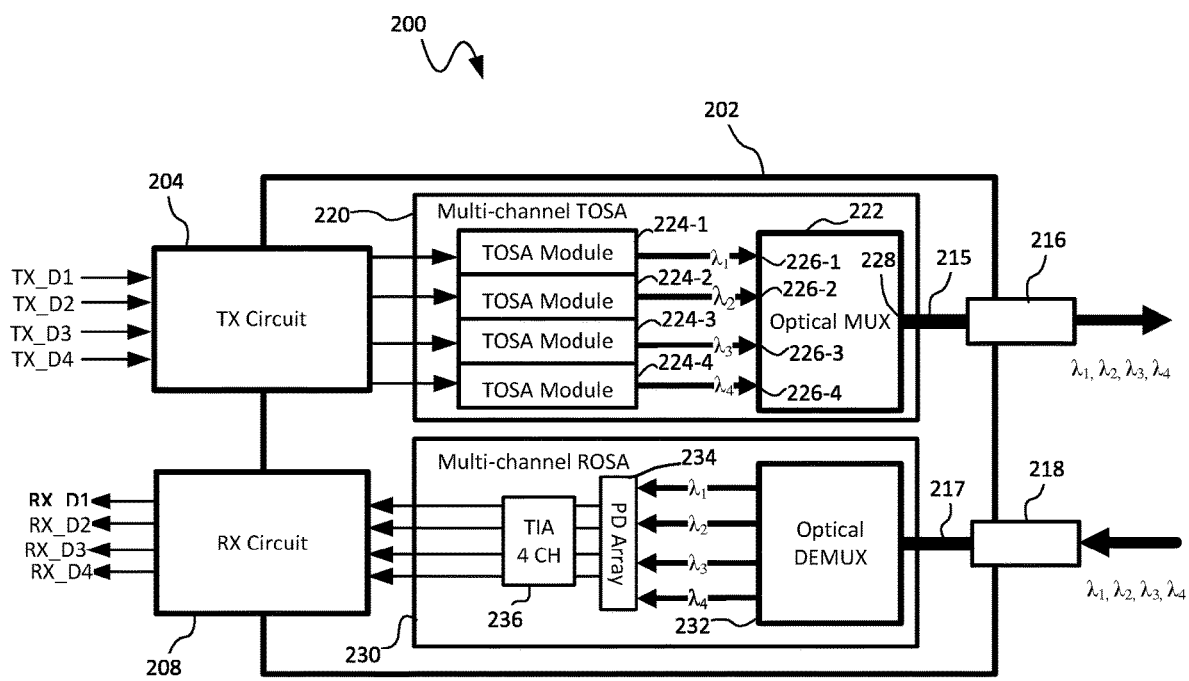
FIG. 2 is a schematic diagram of a multi-channel optical transceiver including a multi-channel transmitter optical sub-assembly (TOSA) and multi-channel receiver optical sub-assembly (ROSA), consistent with embodiments of the present disclosure.

Referring to FIG. 2, an optical transceiver 200, consistent with embodiments of the present disclosure, is shown and described. In this embodiment, the optical transceiver 200 transmits and receives four (4) channels using four different channel wavelengths ($\lambda_1, \lambda_2, \lambda_3, \lambda_4$) and may be configured for coarse wavelength division multiplexing (CWDM), although other numbers of channels are possible and within the scope of this disclosure. In one example, the channel wavelengths $\lambda_1, \lambda_2, \lambda_3, \lambda_4$ may be about 1270 nm, 1290 nm, 1310 nm, and 1330 nm, respectively. The optical transceiver 200 may be capable of transmission rates of at least about 10 Gbps per channel. The optical transceiver 200 may also be capable of both short transmission distances of tens of meters, for example, to distances of 2 kilometers or more. The optical transceiver 200 may be used, for example, in internet data center applications or fiber to the home (FTTH) applications.

In an embodiment, the optical transceiver 200 implements a Quad Small Form-Factor Plugging (QSFP) transceiver. For example, the optical transceiver 200 may be implemented within a QSFP receiver that comports with the "SFF Committee Specification SFF-8665 for QSFP+ 28 Gb/s 4X Pluggable Transceiver Solution (QSFP28)" published on May 10, 2013. The aspects and embodiments disclosed herein may be used within other transceiver types and is not necessarily limited to QSFP or QFSP+ transceivers.

The optical transceiver 200 includes a multi-channel transmitter optical subassembly (TOSA) arrangement 220 for transmitting optical signals on the channel wavelengths (e.g., $\lambda_1, \lambda_2, \lambda_3, \lambda_4$) and a multi-channel receiver optical subassembly (ROSA) 230 arrangement for receiving optical signals on the channel wavelengths (e.g., $\lambda_1, \lambda_2, \lambda_3, \lambda_4$). The multi-channel TOSA arrangement 220 and the multi-channel ROSA arrangement 230 are located in a transceiver housing 202. A transmit connecting circuit 204 and a receive connecting circuit 208 provide electrical connections to the multi-channel TOSA arrangement 220 and the multi-channel ROSA arrangement 230, respectively, within the housing 202. The transmit connecting circuit 204 is electrically connected to the electronic components (e.g., the lasers, monitor photodiodes, etc.) in the multi-channel TOSA arrangement 220 and the receive connecting circuit 208 is electrically connected to the electronic components (e.g., the photodiodes, the TIA, etc.) in the multi-channel ROSA arrangement 230. The transmit connecting circuit 204 and the receive connecting circuit 208 include at least conductive paths to provide electrical connections and may also include additional circuitry. The transmit connecting circuit 204 and the receive connecting circuit 208 may communicate with external systems via a data bus, such as a 38-pin connector that comports with physical connector QSFP standards and data communication protocols.

In this embodiment, the TOSA arrangement 220 includes a plurality of TOSA modules 224-1 to 224-4 optically coupled to an optical multiplexer 222 having mux input ports 226-1 to 226-4, with each of the mux input ports 226-1 to 226-4 being located on a same side, and mux output port 228. The TOSA modules 224-1 to 224-4 may be coupled to the mux input ports 226-1 to 226-4 of the optical multiplexer 222 directly. The TOSA modules 224-1 to 224-4 generate optical signals at different respective channel wavelengths (e.g., $\lambda 1$, $\lambda 2$, $\lambda 3$, $\lambda 4$) and the optical multiplexer 222 combines or multiplexes those optical signals to provide a multiplexed optical signal on the mux output port 228 coupled to an output optical fiber 215. The output optical fiber 215 is coupled to an output optical connector 216, such as an LC connector.

Each of the TOSA modules 224-1 to 224-4 may have a coaxial configuration such that the TOSA module is electrically connected at one end to conductive paths on the transmit connecting circuit 204 and optically coupled at the other end. Each of the TOSA modules 224-1 to 224-4 may include a laser for generating laser light at the assigned channel wavelength and optics for coupling the laser light into the respective mux input ports 226-1 to 226-4 of the optical multiplexer 222. The lasers in the TOSA modules 224-1 to 224-4 thus convert electrical data signals (TX_D1 to TX_D4) received via the transmit connecting circuit 204 into modulated optical signals coupled into the optical multiplexer 222. The lasers may include, for example, distributed feedback (DFB) lasers with diffraction gratings. Each of the TOSA modules 224-1 to 224-4 may also include a monitor photodiode for monitoring the light emitted by the lasers. Each of the TOSA modules 224-1 to 224-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA arrangement 230 includes an optical demultiplexer 232 coupled to a photodetector array 234 including, for example, photodiodes. The optical demultiplexer 232 demultiplexes or separates a multiplexed optical signal received on an input optical fiber 217 to provide received optical signals at different channel wavelengths, which are detected by respective photodetectors in the photodetector array 234. The input optical fiber 217 is coupled to an input optical connector 218, such as an LC connector. The multi-channel ROSA 230 also includes a multi-channel transimpedance amplifier 236 electrically connected to the photodetector array 234. The photodetector array 234 and the transimpedance amplifier 236 detect and convert optical signals received from the optical demultiplexer 232 into electrical data signals (RX_D1 to RX_D4) that are output via the receive connecting circuit 208. Although one example of the multi-channel ROSA 230 is described, the optical transceivers 200 may include other types or embodiments of ROSAs.

Figure 3A:
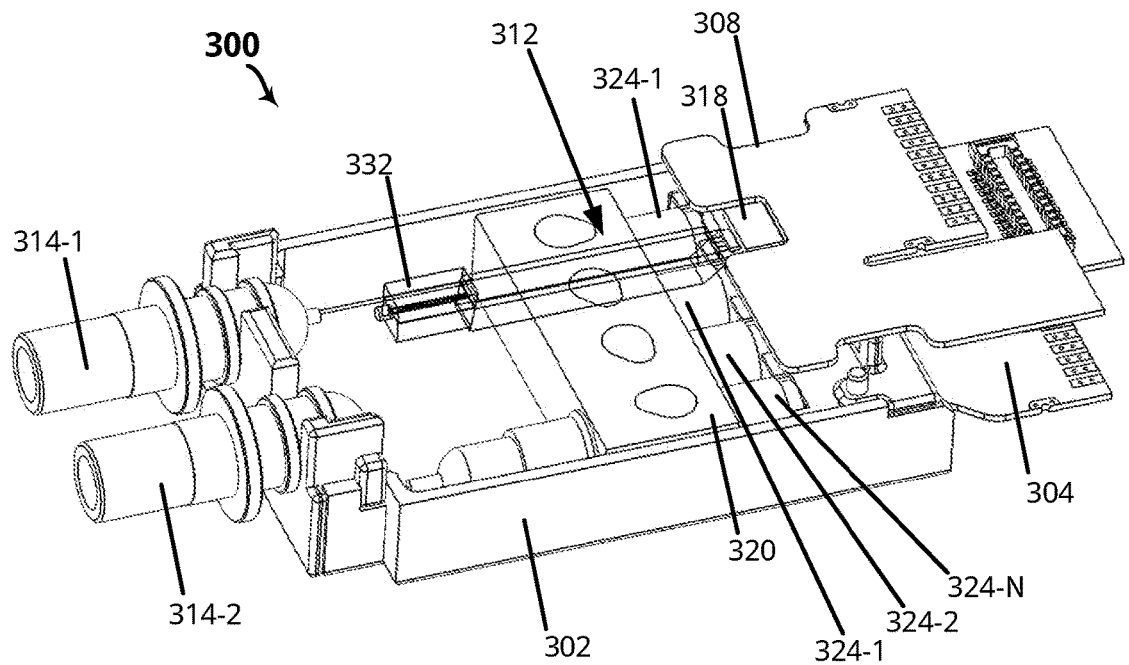
FIG. 3A is a perspective view of the multi-channel optical transceiver of FIG. 2 implemented as a small-form factor pluggable transceiver, in accordance with an embodiment of the present disclosure.

Referring to FIG. 3A, the optical transceiver 300 is shown as an optical transceiver 300 implementing the QSFP+ specification, or other applicable pluggable small-form factor specification. To this end, and in an embodiment, the optical transceiver 300 may be compliant with the QSFP28 MSA standard, and may include physical dimensions that conform to the SFF-8661 specification. In other cases, the optical transceiver 300 may implement the C form-factor pluggable (CFP) standard. In any such cases, the optical transceiver 300 may be configured to transmit and receive at a line rate of at least 100 Gb/s, respectively. This may be particularly advantageous when using the optical transceiver in, for example, a 100GBASE-LR4 application, per the IEEE 802.3bx standards. In an embodiment, the optical transceiver 300 implements the optical transceiver system 200 of FIG. 2.

The optical transceiver 300 includes a transceiver housing 302 and a multi-channel TOSA arrangement 320 disposed within a region of the transceiver housing 302. The multi-channel TOSA arrangement 320 includes a plurality TOSA modules 324-1 to 324-N configured to generate associated channel wavelengths and associated circuitry, which are discussed in further detail below. The multi-channel TOSA arrangement 320 electrically couples to the transmit connecting circuit 304 and also couples to an optical interface port 314-2 of the transceiver housing 302 by way of a waveguide device such as an optical fiber (not shown). The transmit connecting circuit 304 may be implemented as a printed circuit board (PCB) or any other suitable substrate for supporting the transmit connecting circuit 304.

The plurality of TOSA modules 324-1 to 324-N (which may also be referred to as laser packages) may each includes, for example, distributed feedback (DFB) laser diode package. Other laser types are also within the scope of this disclosure such as, for example, other directly modulated laser (DML) diodes and TO can-type laser diodes. The particular laser type chosen may be based on a desired application. For instance, applications that require long-distance, e.g., about 10km or greater, may favor EML lasers. Conversely, applications requiring shorter distances may use DMLs. In any event, and in accordance with an embodiment, each of the TOSA modules 324-1 to 324-N of the multi-channel TOSA arrangement 320 can be configured to transmit at about 25 Gb/s, or greater. Each laser package 324-1 to 324-N of the multi-channel TOSA arrangement 320 may provide a relatively narrow spectrum of channel wavelengths such as a single channel wavelength, or may be configured to provide a broad spectrum of channel wavelengths based on associated optics. In an embodiment, the lasers can provide center wavelengths 375 nm to 1650 nm, for example. The TOSA modules 324-1 to 324-N are discussed in greater detail further below.

The optical transceiver 300 further includes a multi-channel ROSA arrangement 312 disposed within a region of the transceiver housing 302. The multi-channel ROSA arrangement 312 may include an optical demultiplexing device 332. The optical demultiplexing device 332 may comprise an arrayed waveguide grating (AWG) device, for example. The ROSA arrangement 312 electrically is coupled to a receive connecting circuit 308, and optically coupled to an optical interface receptacle 314-1 at an end of the transceiver housing 302 by way of a waveguide device such as an optical fiber (not shown). The receive connecting circuit 308 may be configured as a PCB, for example, although other embodiments are within the scope of this disclosure. The multi-channel ROSA arrangement 312 may use the detectors and the associated circuitry 318 (e.g., a TIA) to detect, amplify and convert de-multiplexed channel wavelengths and may provide the same as electrical data signals, e.g., RX_D1 to RX_D4.

Figure 3B:
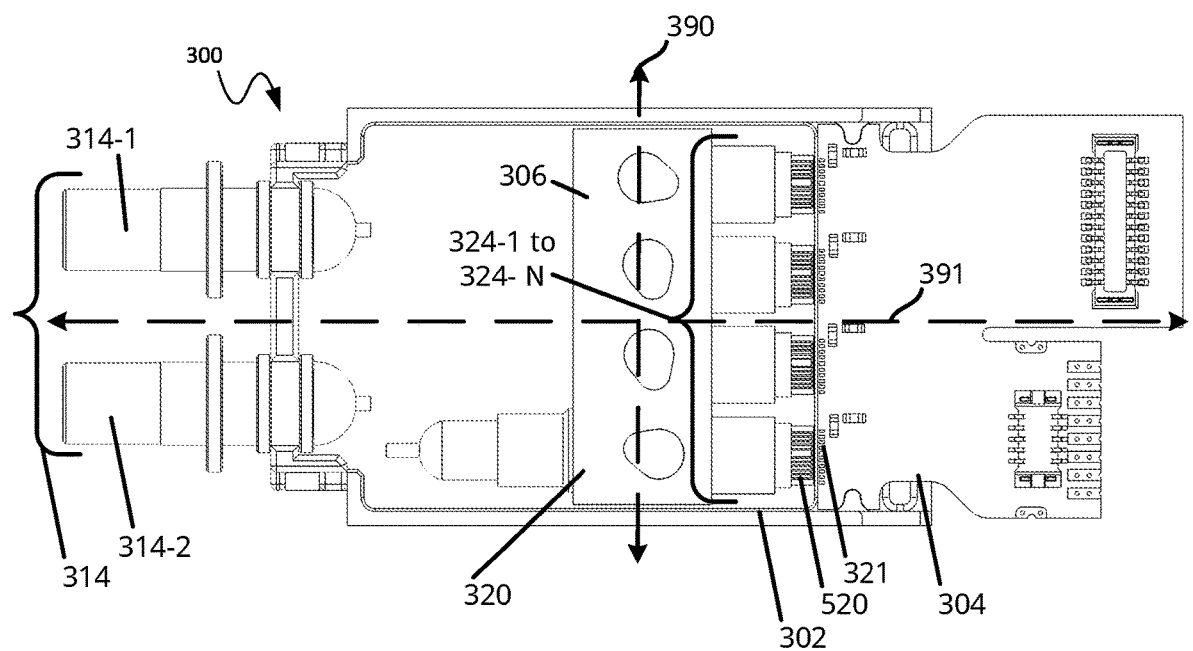
FIG. 3B is a top plan view of the multi-channel optical transceiver of FIG. 3A, in accordance with an embodiment of the present disclosures.

Turning to FIG. 3B, a top plan view of the optical transceiver 300 is shown in accordance with an embodiment of the present disclosure. For the purpose of clarity and practicality, FIG. 3B omits the multi-channel ROSA arrangement 312. As shown, the multi-channel TOSA 320 is shown in a perpendicular orientation, e.g., the longitudinal axis 390 of the TOSA 320 is substantially perpendicular relative to the longitudinal axis 391 of the transceiver housing 302. The multi-channel TOSA 320 includes a housing 306 defined by a plurality of sidewalls 406-1 to 406-6, which are shown and described greater detail below with regard to FIG. 4A. The housing 306 of the multi-channel TOSA 320 is disposed adjacent to the transmit connecting circuit 304.

Figure 4A:
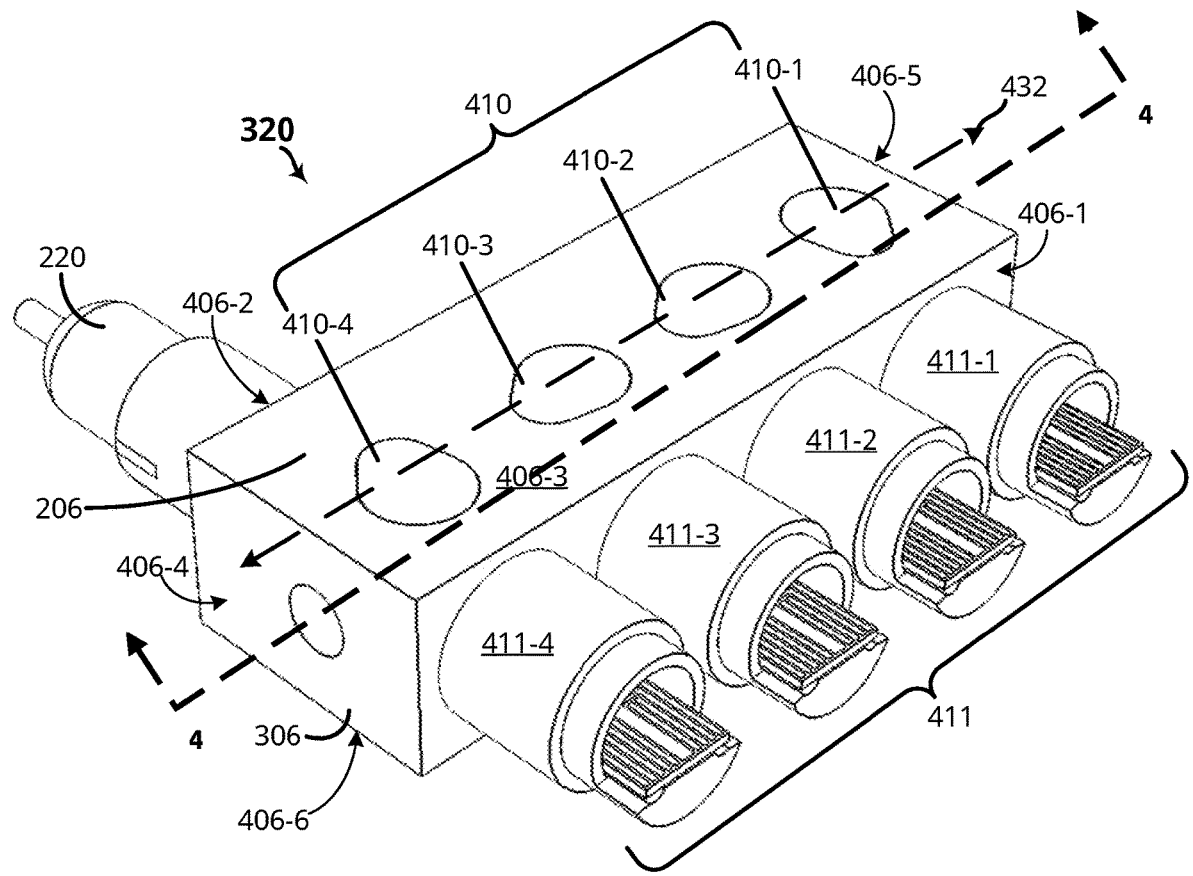
FIG. 4A is a perspective view of a multi-channel optical transmitter including a plurality of TOSA modules in accordance with an embodiment of the present disclosure.

Turning to FIG. 4A, the multi-channel TOSA 320 is shown isolated from the optical transceiver 300 for the purposes of clarity and practicality. In an embodiment, the multi-channel TOSA 320 may include a plurality of sidewalls 406-1 to 406-6, which may also be referred to as a first sidewall 406-1, a second sidewall 406-2, a third sidewall 406-3, a fourth sidewall 406-4, a fifth sidewall 406-5 and a sixth sidewall 406-6, respectively. The first and second sidewalls 406-1 and 406-2 are disposed opposite each other with at least the third sidewall 406-3 adjoining the two. The fourth and fifth sidewalls 406-4 and 406-5 define a first and second end, respectively, with the first and second sidewalls 406-1 and 406-2 extending between the two along the longitudinal center line 432.

In this embodiment, the first sidewall 406-1 may include the plurality of laser assemblies in an array collectively indicated at 411 and individually indicated as laser assemblies 411-1 to 411-4. The TOSA 320 may further include optical filters collectively shown as 410 and individually shown as 410-1 to 410-4. Each of the optical filters 410 may be disposed adjacent an associated laser assembly.

Figure 4B:
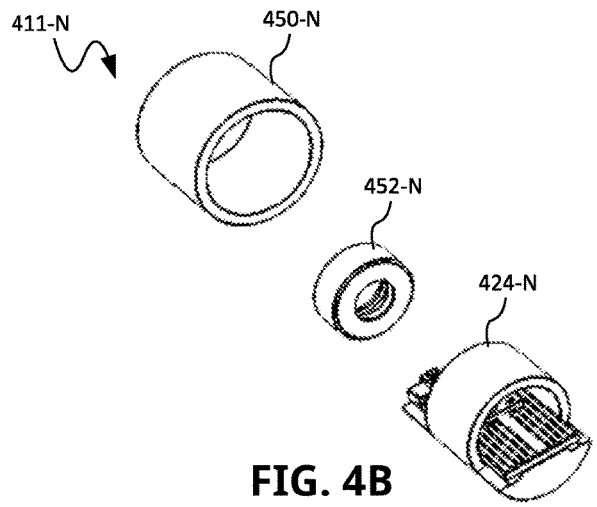
FIG. 4B is an exploded view of a TOSA module in accordance with an embodiment of the present disclosure.

FIG. 4B shows an example laser assembly 411-N in an exploded view in accordance with an embodiment of the present disclosure. As shown, the laser assembly 411-N includes a welding ring 450-N or z-ring 450-N, a collimating lens 452-N and a TOSA module 424-N. The welding ring 450-N may be integral to the body of the multi-channel TOSA 320, e.g., formed as a single piece, or may be separate pieces as shown. The welding ring 450-N may be attached to a respective input port (or opening) of the multi-channel TOSA 320 to allow the TOSA module 424-N to properly align and couple to the multi-channel TOSA 320. As discussed below, the body of the TOSA module 424-N may have a cylindrical shape to allow the same to be easily inserted into an associated welding ring 450-N for mounting to the TOSA housing 306 without the use of an intermediate welding device such as a welding cap. The TOSA module 424 may be concentric with the welding ring 450-N when attached to the TOSA housing, as shown.

Figure 4C:
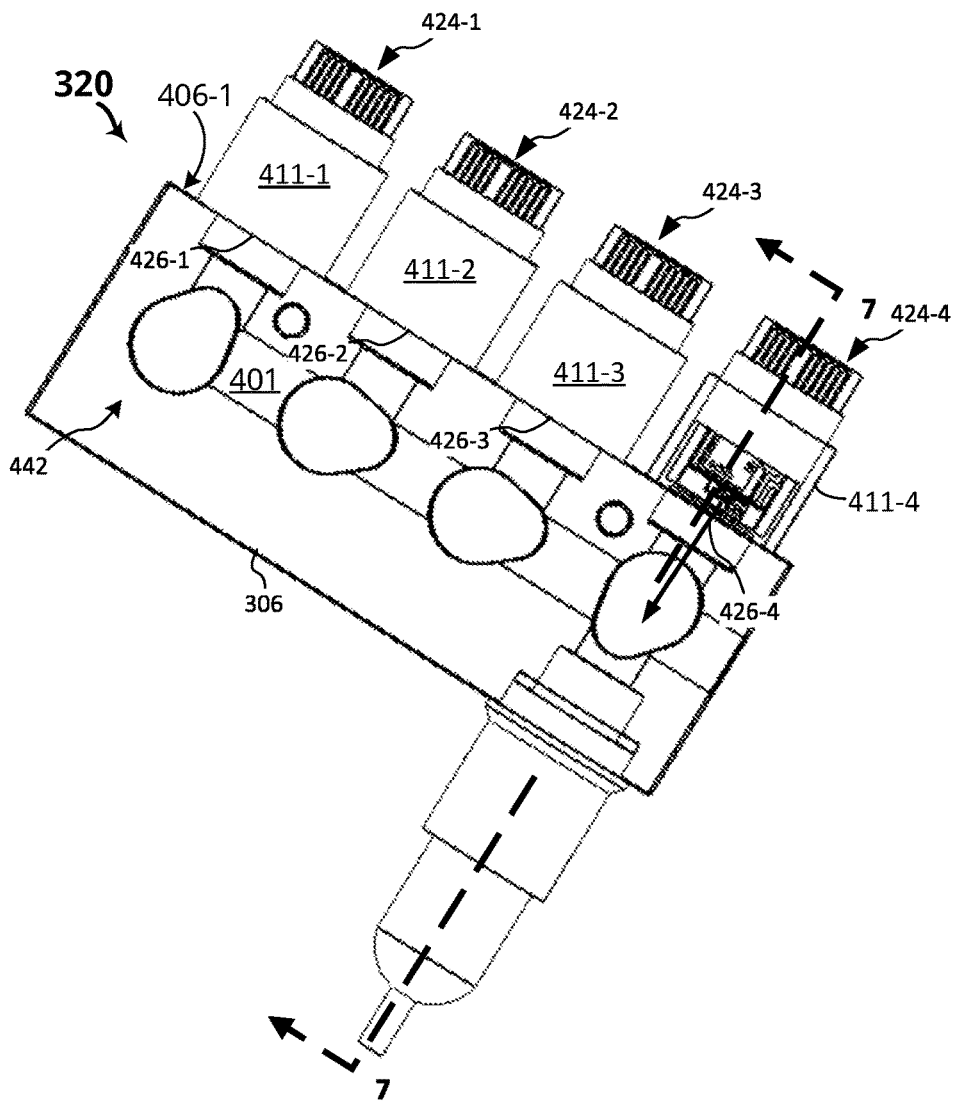
FIG. 4C is a cross-sectional top view of the multi-channel optical transmitter shown in FIG. 4A taken along line 4-4.
Figure 4D:
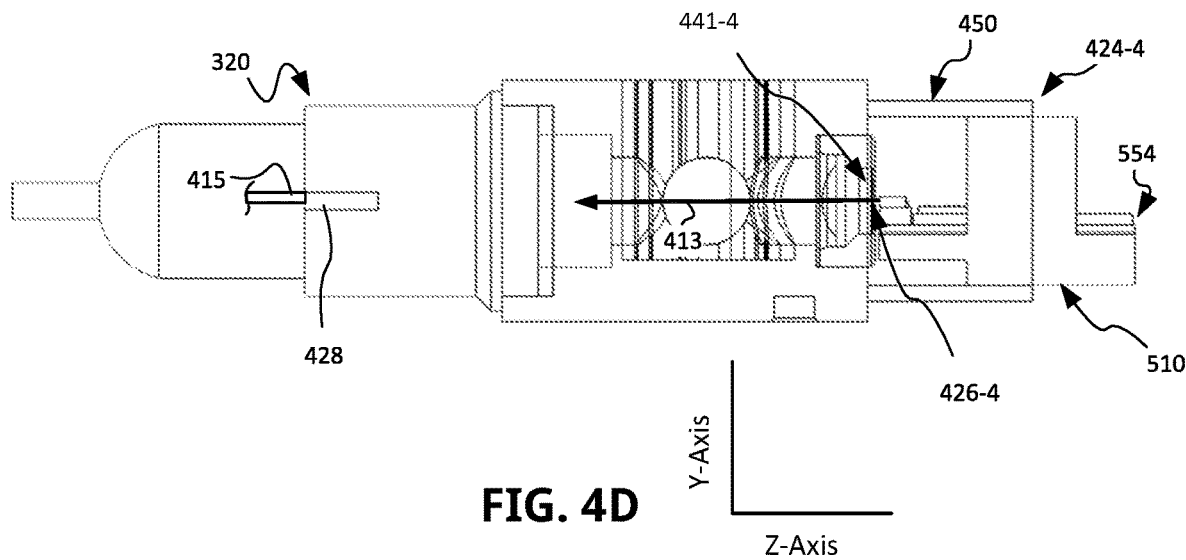
FIG. 4D is a cross-sectional side view of the multi-channel optical transmitter shown in FIG. 4B taken along line 7-7.

Referring to FIGS. 4C and 4D, an embodiment of a multi-channel transmitter 320 may include a plurality of TOSA modules 424-1 to 424-4 optically coupled to and directly aligned with mux input ports 426-1 to 426-4 of the multi-channel TOSA 320. The multi-channel TOSA 320 may be used, for example, as the multiplexing device 222 in the multi-channel transceiver 200 shown in FIG. 2 or may be used separately as a transmitter. Although four (4) TOSA modules 424-1 to 424-4 are shown to support four (4) channels, other numbers of TOSA modules and channels are within the scope of the present disclosure.

In this embodiment, the multi-channel TOSA 320 includes a multiplexer housing 306 with a cavity 401 configured to receive an optical multiplexing arrangement 442. The multiplexer housing 306 may be further configured to receive the TOSA modules 424-1 to 424-4, which are shown as mounted to the multiplexer housing 306. The multiplexer housing 306 includes at least one side wall 406-1 and a plurality of input apertures, e.g., aperture 441-1, through the side wall 406-1 and aligned with the mux input ports 426-1 to 426-4. The TOSA modules 424-1 to 424-4 are optically coupled to and directly aligned with the respective mux input ports 426-1 to 426-4 through the respective input apertures of the sidewall 406-2, e.g., aperture 441-4 shown more clearly in FIG. 4D.

When directly aligned, as shown in FIG. 4D, a laser output 413 from a TOSA module 424-4 passes into the mux input port 426-4 without using an optical fiber or other optical component to change the path of the laser output 413. The laser output 413 may then be coupled via port 428 into fiber 415. The TOSA 320 is designed such that the mux input ports 426-1 to 426-4 are spaced sufficiently to allow the multiple TOSA modules 424-1 to 424-4 to be mounted side-by-side, e.g., in a linear array, on the side wall 406-1 and directly aligned with the mux input ports 426-1 to 426-4. The input apertures of the TOSA 320 may thus have the same spacing, center-to-center, to align with the mux input ports 426-1 to 426-4. In one example, the mux input ports 426-1 to 426-4 may be spaced about 3 mm, or less, for example.

In the illustrated embodiment, Z-rings, e.g., Z-ring 450, are used to mount the TOSA modules 424-1 to 424-4 to the side wall 406-1 of the TOSA housing 306 and to facilitate alignment of the laser output from the TOSA modules 424-1 to 424-4 with the mux input ports 426-1 to 426-4 on the TOSA 320. One example process for coupling TOSA modules 424-1 to 424-4 in a linear array to housing 306 using a welding assembly, e.g., welding assembly 600 and 600A, is discussed further below in greater detail.

Figure 5A:
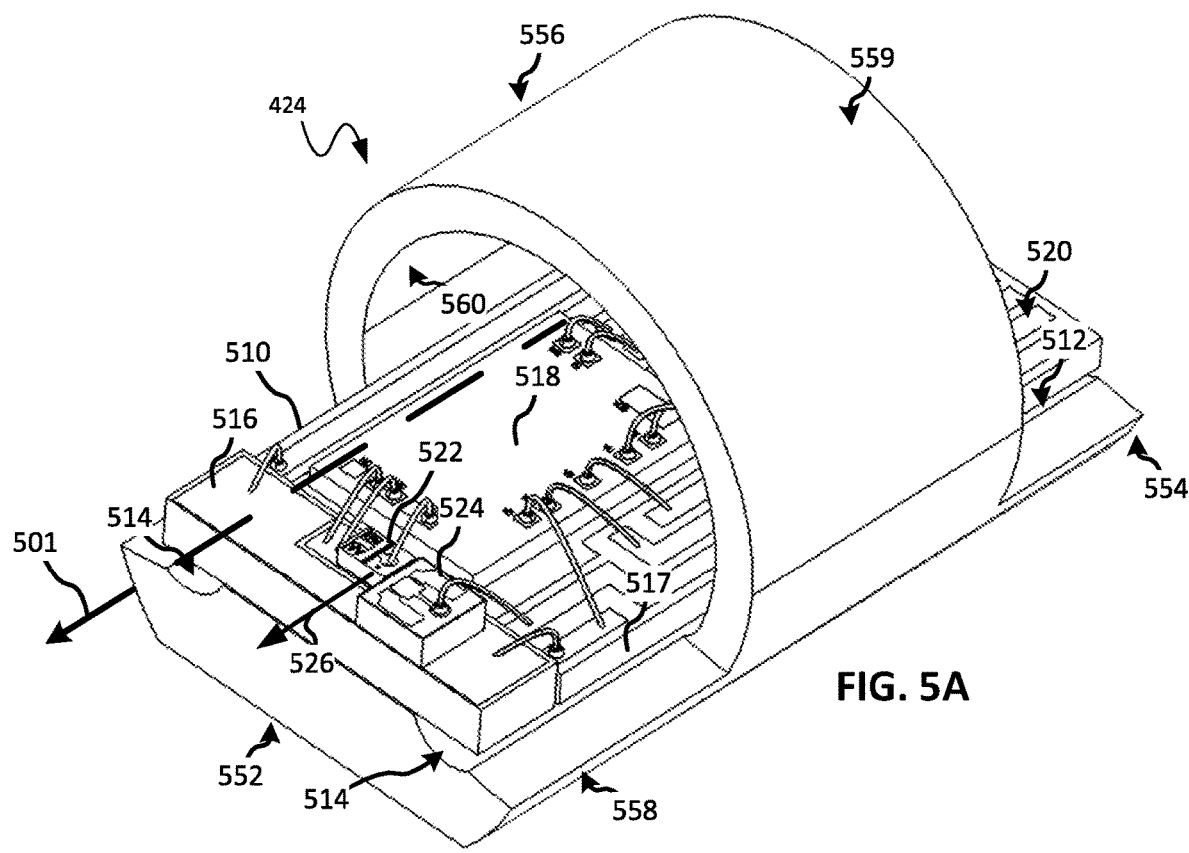
FIG. 5A is a perspective view of a TOSA module used in the multi-channel transmitter shown in FIG. 4A, consistent with embodiments of the present disclosure.
Figure 5B:
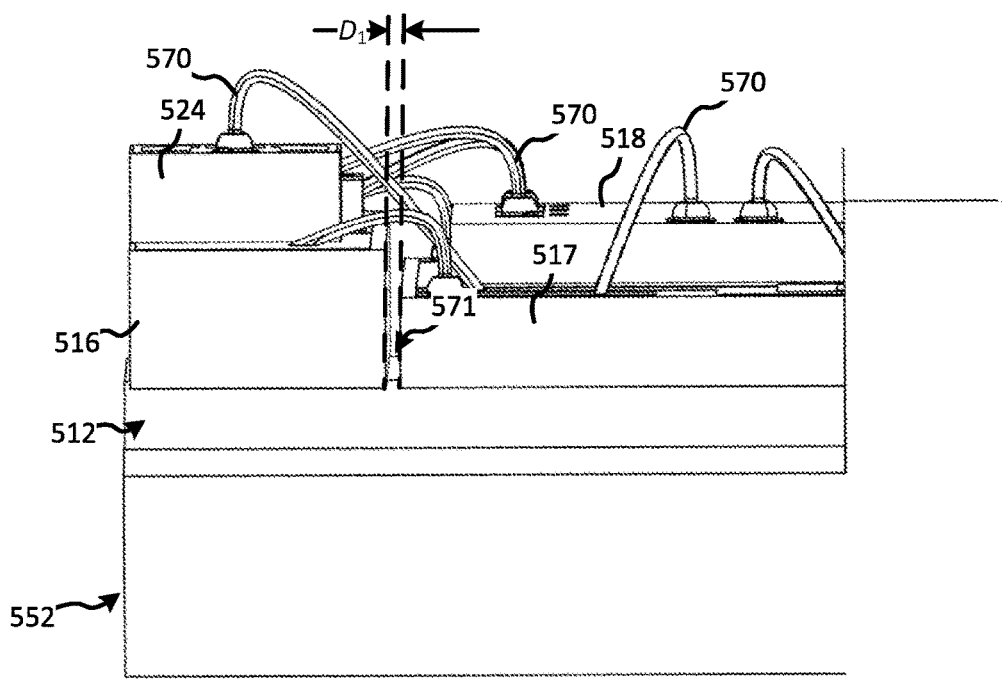
FIG. 5B shows an enlarged partial side view of the TOSA module shown in FIG. 5A.

As shown in FIGS. 5A-5B and described in greater detail below, each TOSA module 424-4 include a base 510, or body 510, having an optical coupling end 552 that is received inside and secured to a respective Z-ring 450. In the illustrated embodiment, the optical coupling end 552 of the base 510 is adjacent a cylindrical shaped region 556 of the base 510, with the cylindrical shaped region 556 being received in a cylindrical aperture in the Z-ring 450, although other shapes are within the scope of the present disclosure. The Z-ring 450 may be made of a metal material such as stainless steel, for example. The material of the Z-ring 450 may be the same as the material of the base 510.

The TOSA housing 306 may be made of a metal material, such as stainless steel, or other suitable material. In some cases, the TOSA housing 306, Z-ring 450 and the base 510 of the TOSA module 424-4 comprise the same metal or alloy, such as stainless steel, copper, aluminum, for example.

FIG. 5A shows an example TOSA module 424 in greater detail. The base 510 includes an electrical coupling end 554 disposed opposite the optical coupling end 552 and walls 558 between the optical coupling end 552 and the electrical coupling end 554 along longitudinal axis 501. The base 510 includes a cylindrical region 556, with the cylindrical region 556 having an outer surface 559 and an inner surface 560 disposed opposite the outer surface 559. As shown in FIG. 5D, the cylindrical region 556 provides the base 510 with a substantially cylindrical shape that allows the TOSA module 424 to be coupled, e.g., via welds, to an associated Z-ring during manufacturing, as discussed in greater detail below. The base 510 may also include notches/channels 514 adjacent to the mounting region 512 and also extending substantially along the longitudinal axis 501.

Figure 5C:
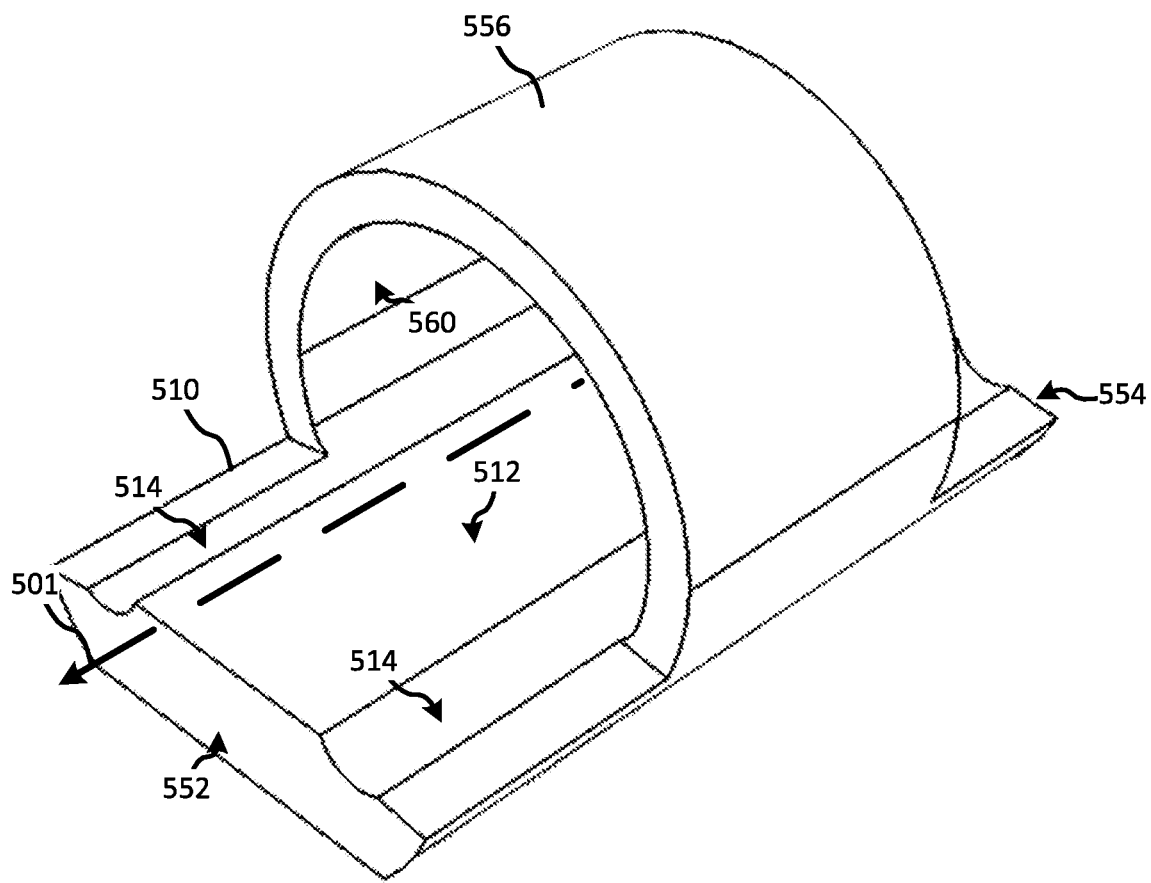
FIG. 5C is another perspective view of a TOSA module used in the multi-channel transmitter shown in FIG. 4A, consistent with embodiments of the present disclosure.
Figure 5D:
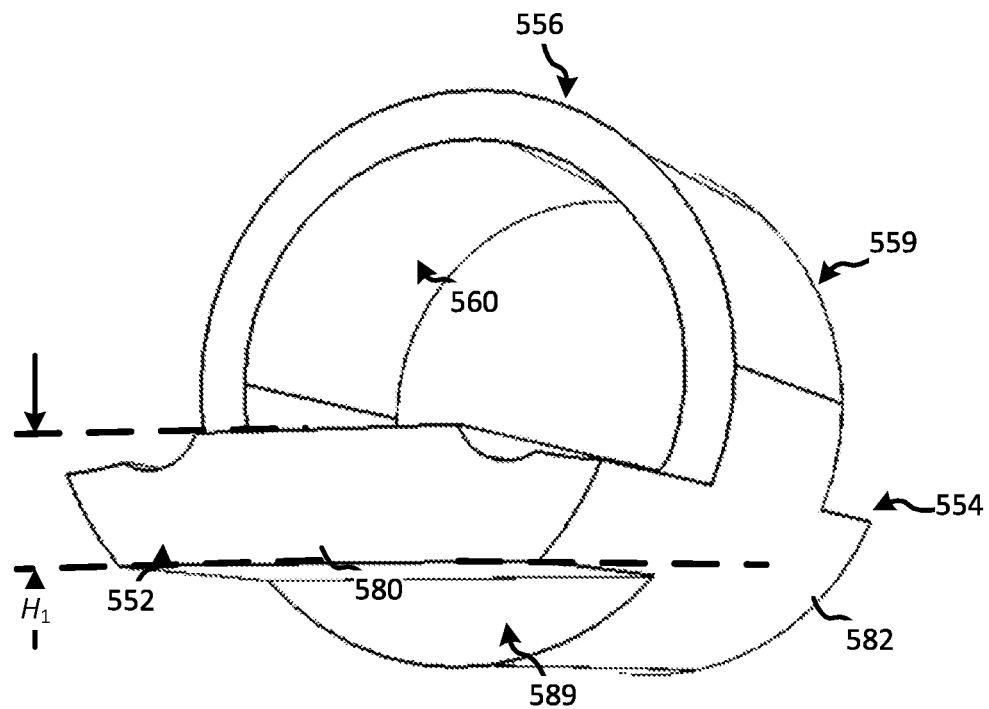
FIG. 5D is yet another perspective view of a TOSA module used in the multi-channel transmitter shown in FIG. 4A, consistent with embodiments of the present disclosure.

The base 510 further includes a mounting region 512, with the mounting region 512 including at least one substantially planar mounting surface that extends along the longitudinal axis 501, which is shown more clearly in FIG. 5C. The mounting region receives and couples to surface mount optical devices and circuitry, which are described in greater detail below.

Referring to FIGS. 5C and 5D, the body 510 includes a first flange 580 and a second flange 582, with the first and second flange extending in parallel along the longitudinal axis 501. The first flange 580 (or arm portion 580) defines a tapered portion having an overall height of H1, with H1 measuring about 0.48 mm. The first flange 580 may be formed by, for example, removing a portion of the body 510 generally indicated at 589. As shown, the first flange 580 defines the optical coupling end 552 and the second flange 582 defines the electrical coupling end 554. The first and second flanges 580 and 582 include profiles that do not increase the overall width of the body 510, and thus, the width of the body 510 remains constant along its entire length, although in other embodiments the body 510 may taper at one or both ends width-wise depending on a desired configuration.

Returning to FIGS. 5A and 5B, with additional reference to FIG. 5C, the laser diode 522 and monitor photodiode 524 are mounted on a diode sub-mount 516, and the laser driver circuitry 518 is mounted on a laser driver sub-mount 517 including conductive paths or traces, e.g., traces 520, for providing electrical connections. The diode sub-mount 516 and laser driver sub-mount 517 may comprise a printed circuit board (PCB) or other suitable substrate. The inner surface 560 of the cylindrical region 556 may act, essentially, as a stop to prevent lateral movement of the laser driver sub-mount 517. The laser driver sub-mount 517 may extend at least partially through a passageway of the cylindrical region, with the passageway having a semi-cylindrical shape. In some cases, such as shown, the laser driver sub-mount 517 may extend out from the cylindrical region 559 towards the electrical coupling end 554, as shown. Therefore, when a TOSA module is coupled to a TOSA and disposed in a housing, the traces 520 may be disposed in close proximity to allow for direct coupling with transmit circuitry. For example, as shown in FIG. 3B, the electrical traces 520 are disposed within 20 to 100 μm of the transmit connecting circuit 304, thus allowing for direct coupling, e.g., using wire bonding, between the traces 520 and the pads 321 of the transmit connecting circuit.

The laser diode 522 may be configured to emit a single channel wavelength, e.g., 1270 nm, 1290 nm, 1310 nm, or 1330 nm, generally along direction 526 towards the TOSA 320, for example. Other TOSA modules having different configurations are also within the scope of this disclosure. Optical signals at different channel wavelengths (e.g., λ1, λ2, λ3, λ4) may thus be coupled into the respective ports 226-1 to 226-4 of the optical mux 222 (FIG. 1) via respective TOSA modules 224-1 to 224-4. The optical mux 222 may then generate a multiplexed optical signal combining the channel wavelengths and output the same from the port 228.

Referring to FIG. 5B, with additional reference to FIG. 5A, the laser diode 522 and monitor photodiode 524 and diode sub-mount 516 may be mounted in a sandwich fashion to the mounting region 512, and more particularly, to a surface thereof. Likewise, the laser driver circuitry 518 and laser driver sub-mount 517 may also be mounted in a sandwich fashion with a surface of the mounting region 512. Accordingly, the laser diode 522, monitor photodiode 524, and laser driver sub-mount 517 may thermally conduct heat to the base 510 during operation. The base 510 (or body 510) may comprise any material that provides suitable thermal conductivity, such as copper, aluminum, or any metal/alloy having a desired thermal conductivity. The base 510 may be formed from a single piece to ensure optimal thermal conductivity, or may be formed from multiple pieces of a same or different material. An associated Z-ring, e.g., Z-ring 450-N, and the TOSA housing 306 may comprise an identical material, or material having substantially similar thermal conductivity, to that of the base 510 to allow heat to dissipate during operation. For example, each of the base 510, Z-ring 450-N and TOSA housing 206 may comprise copper, aluminum, brass, steel, bronze, or an alloy thereof.

Referring to FIG. 5B, the laser driver circuitry 518 and laser driver sub-mount 517 may be separated by a gap 571 from the laser diode 522, monitor photodiode 524 and diode sub-mount 516. The gap 571 may measure a distance D1, with distance D1 measuring about 0.1 to 1.0 mm, depending on a desired configuration. The gap 571 may comprise air or another material such as a gel. The gap 571 may be generally uniform in distance such as shown, but this disclosure is not necessarily limited in this regard. In any event, the gap 571 may advantageously prevent heat from the laser driver circuitry 518 from directly conducting onto the laser diode 522 and monitor photodiode 524, and vice-versa. The gap 571 may be sized to allow for wire bonding 570 to extend across the gap 571 to electrically couple the laser driver circuitry 518 to the laser diode 522 and the monitor photodiode 524 to the traces 520, for example.

Figures 6, 7:
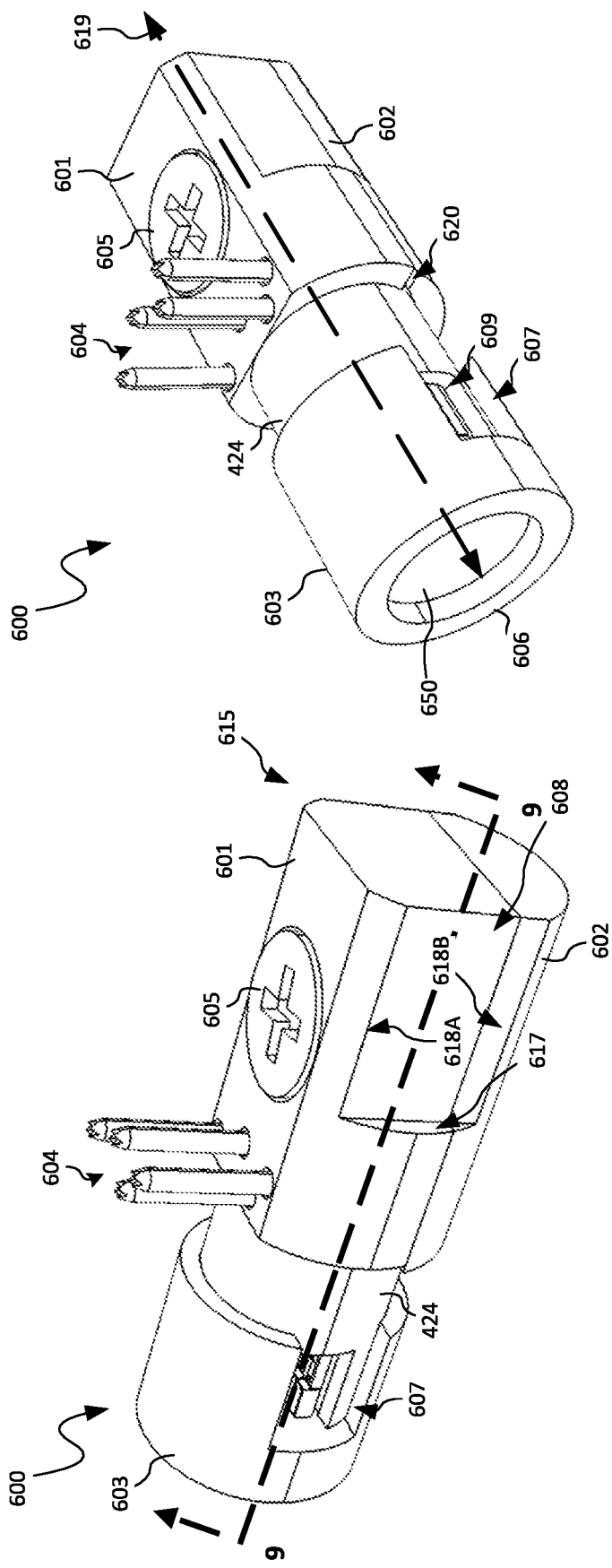
FIGS. 6-7 are perspective views collectively showing an example welding assembly in accordance with an embodiment of the present disclosure.

Turning to FIGS. 6 and 7, an example welding assembly 600 for coupling a TOSA module, e.g., TOSA module 424, to a subassembly housing is shown in accordance with an embodiment of the present disclosure. The welding assembly 600 may be utilized to mechanically align and couple a TOSA module, e.g., TOSA module 424, to an associated housing, e.g., housing 306. One example process for utilizing the example welding assembly 600 during a coupling and active alignment process is discussed further below with reference to FIG. 10.

As shown, the example welding assembly 600 includes a first clamp portion 601 and a second clamp portion 602. The first and second clamp portions 601 and 602 are configured to couple together and hold the TOSA module 424 at a fixed position during coupling and optical alignment of the same into the housing 306. The first and second clamp portions 601 and 602 may be comprised of a metal, polymer, plastic or other suitably rigid material. The first and second clamp portions 601, 602 may be formed from a same material or a different material.

Figure 10:
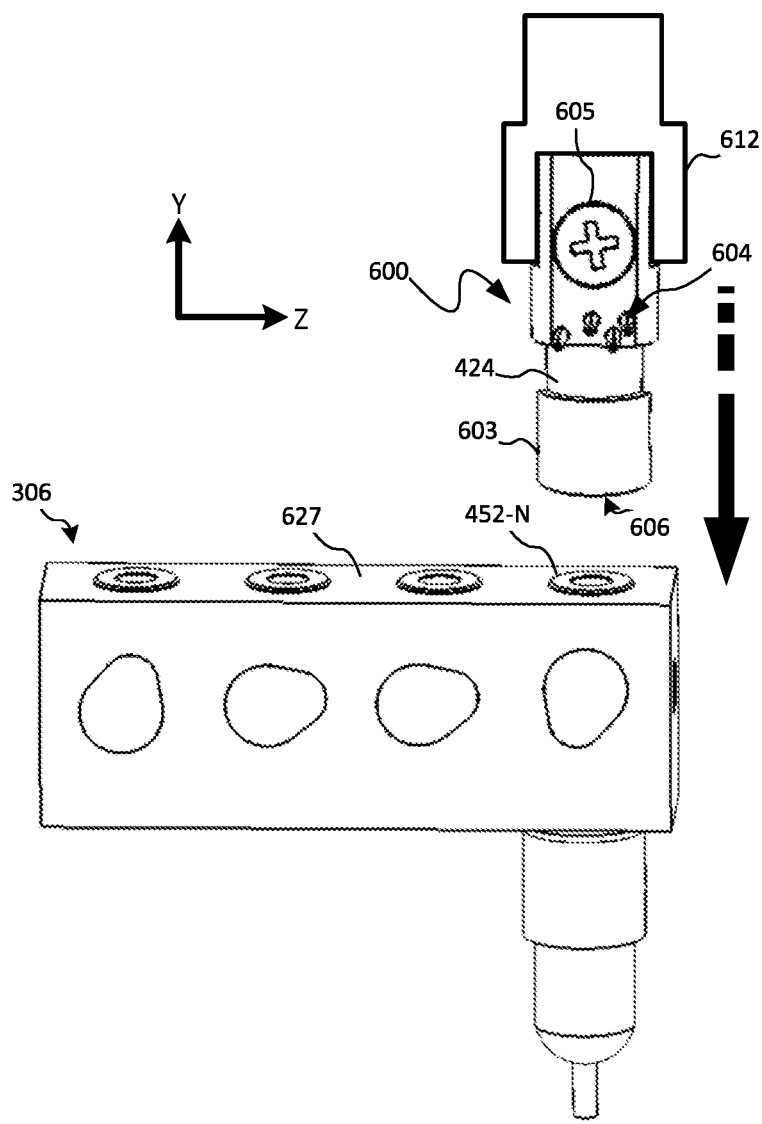
FIG. 10 illustrates an example alignment and coupling process for a welding assembly configured in accordance with various aspects and embodiments disclosed herein.

The first and second clamp portions 601 and 602 may each include a plurality of sidewalls and collectively form a body portion 615, or multi-part body 615, when coupled together. The body portion 615 may include a substantially cylindrical shape as shown although other embodiments are within the scope of this disclosure. A fixation member 605 such as a screw, peg, or other suitable device may couple the first and second clamp portions 601 and 602 together. The body portion 615 may define a tapered wall 608 that allows for a mechanical gripper of a welding system, for example, to securely hold the body portion 615 during welding processes. One such example mechanical gripper 612 (or gripper 612) is shown in FIG. 10.

The tapered wall 608 may include a textured surface (e.g., ridges, bumps, protrusions) to increase friction when in communication with gripper 612. The tapered wall 608 may extend from an end of the body 615 to a predetermined distance along longitudinal axis 619, with the predetermined distance being sufficient to allow for a secure connection between the gripper 612 and the tapered wall 608. A surface 617 disposed a distal end of the of the tapered wall 608 extends substantially perpendicular to a surface defining the tapered wall 608 and may act as a stop to ensure that the gripper 612 can provide suitable counter-force when the welding assembly 600 is pressed against the housing 306.

The tapered wall 608 may be defined at least in part by surfaces 618A and 618B which extend substantially perpendicular to the surface defining the tapered wall 608. The surfaces 618A and 618B may act as a guide and allow the gripper 612 to securely hold the welding assembly 600 and prevent lateral movement of the same during alignment and coupling processes as variously disclosed herein. Each of the first and second clamp portions 601 and 602 may define at least a portion of the tapered wall 608, although this disclosure is not necessarily limited in this regard. For example, the tapered wall 608 may be provided by only one of the first and second clamp portions 601 and 602.

Continuing with FIGS. 6 and 7, the body portion 615 may include an overall width that allows a linear array of laser assemblies to be coupled to the housing 306 in relatively close proximity to each other (e.g., within 3mm or less). For instance, and as more clearly shown in FIG. 3C, each of the laser assemblies 424-1 to 424-4 are coupled to the housing 306 in a linear array with a relatively small distance, e.g., <3 mm, between adjacent laser assemblies. To this end, the body portion 615 of the welding assembly 600 may include an overall width along longitudinal axis 619 that is about equal to or less than the diameter of associated Z-rings, e.g., Z-ring 450-N. Stated differently, the welding assembly 600 may include a relatively small footprint that is no wider than a given laser assembly once coupled to the housing 306. This ensures that a chosen spacing between adjacent laser assemblies is based on a desired configuration rather than a spacing that is necessitated by the width of the welding assembly 600. In addition, the low-profile of the body portion 615 ensures that a laser welding fixture has an unobstructed "view" of a TOSA module and associated components during welding processes.

The body portion 615 provides a TOSA module receptacle (which may be referred to as a socket or opening) for removably engaging and holding the TOSA module 424 securely in place, which is discussed in greater detail below with regard to FIGS. 8-9. The first and second body portions 601 and 602 may be shifted relative to each other to perform minor pitch corrections for the TOSA module 424. For example, the fixation member 605 and associated fixation passageway 621, which is more clearly shown in FIG. 8, may be oversized relative to the driving head 623 to provide a relatively wide tolerance to allow the first clamp portion 601 to be shifted/offset longitudinally relative to the second clamp portion 602. For example, offset 620 (FIG. 7) may occur relative to the tightening/loosening of the fixation member 605. The offset 620 may proportionally adjust the pitch of the TOSA module 424 at a non-zero pitch angle relative to the longitudinal axis 619. These fine-grain pitch adjustments may be utilized during alignment processes to ensure nominal laser performance prior to welding.

A shown, the alignment member 603 includes a substantially cylindrical shape. The alignment member 603 may include a tapered female opening 609 (or TOSA module receptacle 609), which is more clearly shown in FIG. 8, which includes a shape that generally corresponds to an optical coupling end of the TOSA module 424. Thus, the tapered female opening 609 may be configured to receive at least a portion of the TOSA module 424 and couple thereto to form a frictional connection. The alignment member 603 may include side opening 607 to allow for the alignment member 603 to be decoupled from the TOSA module 424 by longitudinal movement, e.g., by gripper 612, away from the TOSA module 424 followed by lateral movement, with the lateral movement causing a flange portion (and associated circuitry) of the TOSA module 424 to pass through the side opening 607 without disturbing/displacing the position of the welding assembly 600.

The alignment member 603 includes at least one alignment contact surface, such as alignment contact surface 606. The alignment contact surface 606 extends substantially perpendicular to that of the longitudinal axis 619. The alignment contact surface 606 is configured to extend substantially in parallel with an emission face 628 (FIG. 9) of a laser diode coupled to an optical coupling end 552 of the TOSA module 424 when the same is coupled into the tapered female opening 609. During an alignment and coupling process the alignment contact surface 606 therefore acts as a guide to ensure the TOSA module 424 is substantially perpendicular to the housing 306 prior to welding to ensure nominal optical performance. One such example coupling and alignment process is discussed in greater detail below with reference to FIG. 10. The alignment member 603 may further include a recessed region 650 to receive a portion of a collimating lens 452-N that extends from the housing 306 such as shown in FIG. 10. Thus the alignment contact surface 606 may directly contact and be flush with a surface of the housing 306 during an alignment and coupling process without being obstructed by the collimating lens 452-N. Note that the collimating lens 452-N may be coupled to an associated opening at various points during manufacture and may not necessarily be present when the TOSA module 424 is aligned via direct contact with the surface of the housing 306.

The temporary electrical connection members 604 may comprise, for example, spring-loaded pogo pins or other similar devices that allow for temporary electrical connectivity without wire bonding or other more permanent fixation approaches. The temporary electrical connection members 604 may be disposed in respective passageways 669 (FIG. 9) that extend substantially perpendicular to that of the longitudinal axis 619. A first end of each of the temporary electrical connection members 604 may electrically couple to a respective trace 624 (FIG. 8) of the TOSA module 424. A second end of each of the temporary electrical connection members 604 may extend from the first clamp portion 601 and couple to driver circuitry in order to receive a voltage/current to drive the TOSA module 424 during active alignment processes.

Figure 8:
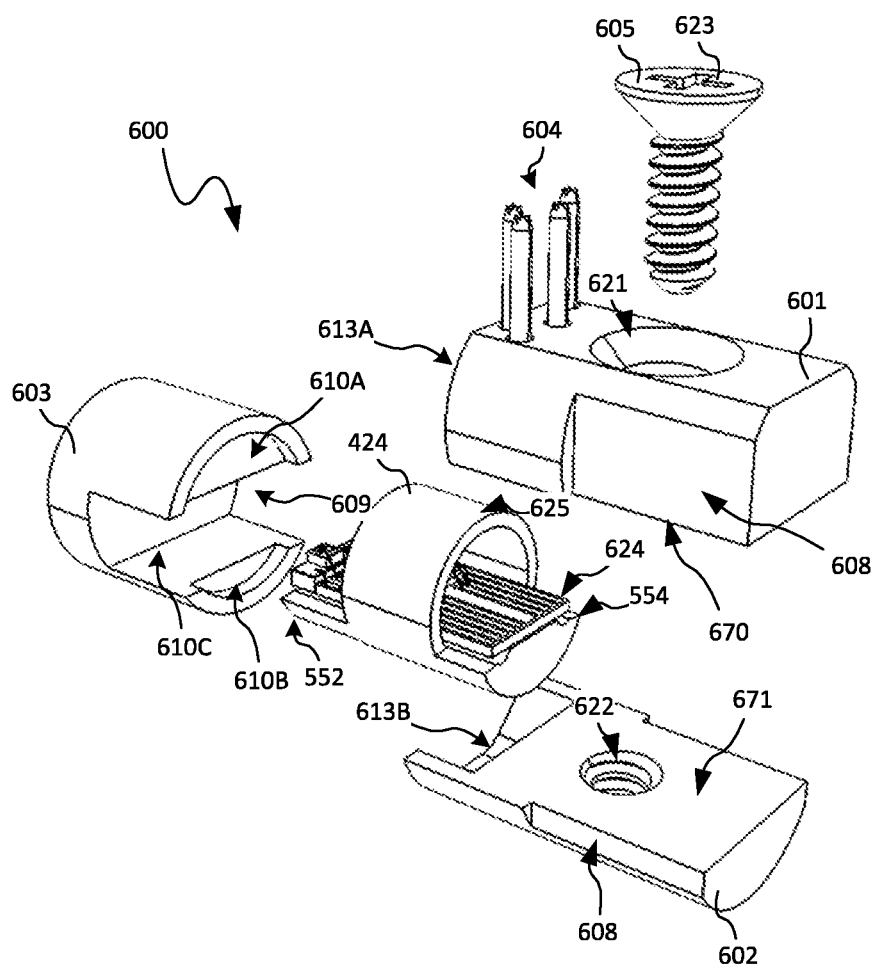
FIG. 8 is an unassembled view of the example welding assembly of FIGS. 6-7 in accordance with an embodiment of the present disclosure.

Turning to FIG. 8, an unassembled view of the welding assembly 600 is shown in accordance with an embodiment of the present disclosure. As shown, the first and second clamp portions 601 and 602 collectively define a TOSA module receptacle 613 (or TOSA module socket 613) based at least in part on tapered regions 613A and 613B, which are more clearly shown in the cross-sectional view of FIG. 9. The first and second clamp portions 601 and 602 also include a fixation passageway 621 that is coaxial with the fixation passageway 622 when the first and second clamp portions 601 and 602 are coupled to each other. Also shown is mating surface 670 that extends along the longitudinal axis of the first clamp portion 601. The second clamp portion 602 also includes a mating surface 671 that extends along the longitudinal axis of the second clamp portion. The first and second mating surfaces 670 and 671 may be substantially flat, as shown, although other embodiments are within the scope of this disclosure.

The TOSA module receptacle 613 may include a shape that corresponds with an electrical coupling end 554 of the TOSA module 424 and may receive at least a portion of the same and form a frictional connection therewith. For example, the tapered region 613B may include a generally hemispherical (or arcuate) shape, although other shapes are within the scope of this disclosure depending on the particular contours chosen for the TOSA module 424.

As further shown, the alignment member 603 includes the female tapered opening 609 that may also be accurately referred to as a TOSA module receptacle 609. In this embodiment, the tapered opening 609 includes a first recessed region 610A, with the first recessed region 610A having a shape that corresponds with an integrated welding member portion 625. For example, the first recessed region 610A may include a partial hemispherical shape that corresponds with the spherical shape of the integrated welding member 625. Therefore, at least a portion of the integrated welding member 625 may be received within the recessed region 610A. Likewise, a second recessed region 610B may be configured with a shape that corresponds with the integrated welding member 625 such that same may be at least partially received therein. A third recessed region 610C may be configured to receive at least a portion of the optical coupling end 552 of the TOSA module 424.

Figure 9:
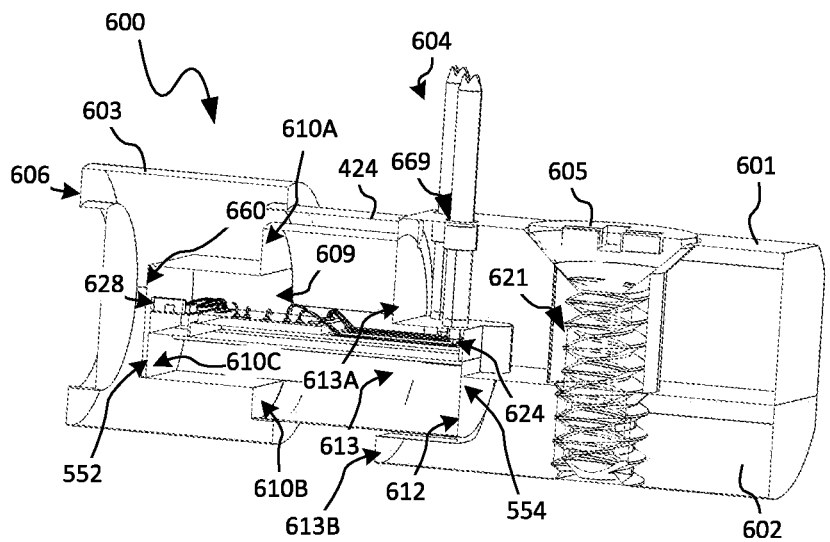
FIG. 9 is a cross-sectional view of the example welding assembly of FIGS. 6-7 in accordance with an embodiment of the present disclosure.

FIG. 9 shows a cross-sectional view of the welding assembly 600 taken along the line 9-9 of FIG. 6, in accordance with an embodiment of the present disclosure. As shown, the first and second clamp portions 601 and 602 couple in a sandwich fashion and securely hold an electrical coupling end 554 of the TOSA module 424 in a fixed position. The temporary electrical connection members 604 extend through a portion of the first clamp portion 601 via passageways 669 and electrically couple with traces 624. A spring element (not shown) within each of the temporary electrical connection members allow the same to directly contact an associated electrical trace 624 and to retract and allow the TOSA module 424 to be removed from the TOSA module receptacle 613 after the TOSA module 424 has been coupled to the housing 306. As further shown, the emission face 628 of a laser diode of the TOSA module 424 may be substantially parallel with a surface 660 that defines a portion of the third tapered region 610C. The surface 660 may be substantially parallel with the alignment contact surface 606.

Turning to FIG. 10, the welding assembly 600 is illustrated adjacent the TOSA housing 306 during a coupling and active alignment process, in accordance with an embodiment of the present disclosure. The process begins with securing a TOSA module, e.g., TOSA module 424, into the welding assembly 600. This may include coupling the first and second clamp portions 601 and 602 over the TOSA module 424. The fixation member 605 may be utilized to securely couple the first and second clamp portions 601 and 602 over the TOSA module 424. Next, the alignment member 603 may be coupled to the optical coupling end 552 of the TOSA module 424. The welding assembly 600 may then be inserted into the gripper 612, with the gripper 612 being associated with a welding system (not shown) that allows the gripper 612 to move along various axis for alignment purposes. The gripper 612 may then travel along the Y axis until the alignment contact surface 606 is in direct contact and flush with a surface 627 of the housing 306.

When the alignment contact surface 606 directly contacts and is flush with the surface 627 of the housing 306 the TOSA module 424 is considered in alignment, wherein alignment includes the TOSA module 424 extending substantially perpendicular relative to the surface 627 to cause the emission face 628 of a laser diode of the TOSA module 424 to be substantially parallel relative to the surface 627 of the housing 306. Thus the alignment contact surface 606 contacts the surface 627 of the associated subassembly housing to mechanically align an emission face 628 of the TOSA module substantially in parallel with the surface 627 of the associated subassembly housing. The alignment contact surface 606 advantageously provides an indication of successful alignment based on the same being flush with the surface 627.

The welding assembly 600 may then retract via gripper 612 while maintaining the X and Z axis position. Once retracted a suitable distance the alignment member 603 may be removed to expose the optical coupling end 552 of the TOSA module 424. At this time, and if not already added, the collimating lens 452-N may be coupled into an associated opening of the housing 306. A welding member, e.g., Z-ring 450-N, may then be placed over the collimating lens 452-N and the welding assembly 600 may then travel again along the Y axis to cause the TOSA module 452-N to pass through the welding member. The gripper 612 may continue to travel along the Y axis in this fashion until the optical coupling end 552 of the TOSA module 424 makes direct contact with or is otherwise in close proximity with the surface 627. At this stage the gripper 612 may be in a "locked" configuration wherein the TOSA module 424 remains perpendicular relative to the housing 306. The TOSA module 424 may then be moved along the Z and X axis to center the TOSA module 424 over the associated collimating lens 452-N.

Next, and with the TOSA module 424 in position relative to the housing 306, an electrical signal may be supplied via the temporary electrical connection members 604 to drive the TOSA module 424. Power measurements may then be analyzed to determine whether the TOSA module 424 is optically aligned with the housing 306. One or more welds may then be introduced between the TOSA module 424 and the welding member as well as the welding member and the housing 306, e.g., via a hammering process, with subsequent power measurements taken to ensure proper optical alignment. This process may be repeated N number of times to couple a linear array of TOSA modules to the housing 306, with the linear array having a spacing of 3 mm or less between adjacent TOSA modules.

Figure 11:
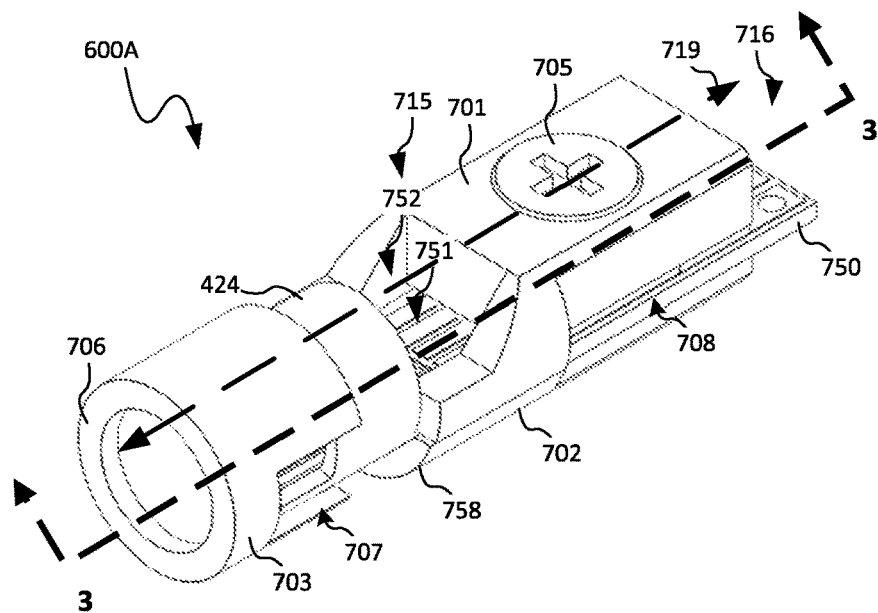
FIG. 11 is another example welding assembly in accordance with an embodiment of the present disclosure.

Turning to FIG. 11, another embodiment of a welding assembly 600A is shown in accordance with an embodiment of the present disclosure. The welding assembly 600A may be utilized to mechanically align and couple a TOSA module, e.g., TOSA module 424, to an associated housing, e.g., housing 306 of FIG. 3B. One example process for utilizing the example welding assembly 600A is discussed above with reference to FIG. 10.

The welding assembly 600A includes a first clamp portion 701, a second clamp portion 702, and an alignment member 703. The first and second clamp portions 701 and 702 may be defined by a plurality of sidewalls that extend along a longitudinal axis 719 from a first end 716 (which may be referred to as an electrical coupling end 716) to a second end 758 (which may be referred to as a TOSA module receptacle 758). The first and second clamp portions 701 and 702 include mating surfaces 770 and 771, respectively, to couple to each other. The mating surface 770 and 771 may be substantially flat although other embodiments are within the scope of this disclosure.

When the first and second clamp portions 701 and 702 are coupled together via the mating surfaces 770 and 771 they may collectively form a body 715. A printed circuit board (PCB) 750 is disposed between the first and second clamp portions 701 and 702. The PCB 750 includes a plurality of electrical traces 751 that extend along the longitudinal axis 719 from the first end 755 to the second end 756.

Adjacent the electrical coupling end 716 a portion of the electrical traces 751 are exposed to allow for electrical coupling to driver circuitry, e.g., via temporary wire bonding, with the driver circuitry being configured to provide electrical signals during active alignment processes, for example. The first clamp portion 701 includes at least two arm portions, e.g., arms 753A and 753B, which define a port or opening 752. The portion of the electrical traces 751 exposed via the port 752 allow for the PCB 750 to be electrically coupled to the TOSA module 424, e.g., via temporary wire bonding, to provide electrical signals received via the electrical coupling end 716.

The welding assembly 600A may be configured substantially similar to that of the welding assembly 600 of FIGS. 6-9, and may be utilized in the coupling and alignment process of FIG. 10 with minor modification, and for this reason the description of which is equally applicable and will not be repeated for brevity. For example, the tapered wall 708 allows a gripper, such as gripper 612, to couple to the welding assembly 600A. Likewise, the alignment contact surface 706 may be utilized to ensure the emission face of the TOSA module 424 is flush relative to the housing 306. In addition, the alignment member 703 may include opening 707 to allow for easy decoupling of the alignment member 703 from the TOSA module 424.

Figure 12:
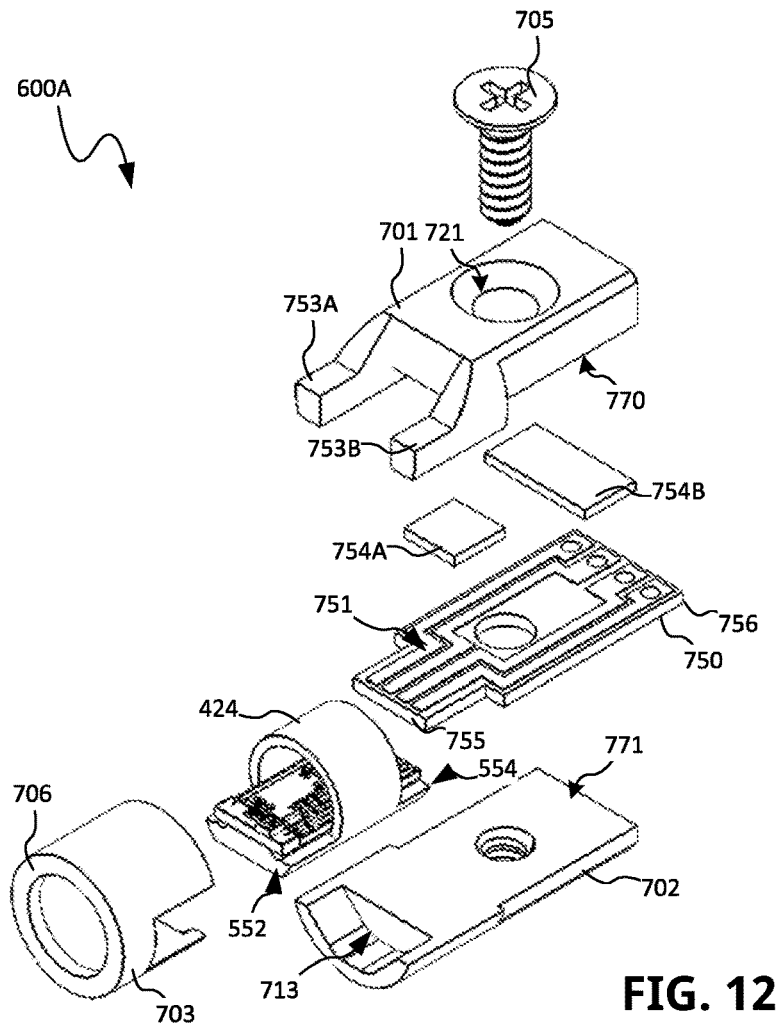
FIG. 12 is an unassembled view of the example welding assembly of FIG. 11 in accordance with an embodiment of the present disclosure.

Turning to FIG. 12, the welding assembly 600A is shown unassembled in accordance with an embodiment of the present disclosure. As shown, one or more insulating members, e.g., insulator members 754A and 754B, may be disposed between the electrical traces 751 and the first clamp portion 701 to provide electrical isolation and prevent an electrical short therebetween. The insulator members 754A and 754B may comprise, for example, tape or any other suitable substrate for providing electrical isolation between electrical elements. The fixation passageway 721 extends through the first clamp portion 701, PCB 750, and second clamp portion 702. The fixation member 705 may comprise a screw, as shown, or any other suitably fixation member such as a peg. The fixation member 705 may be coupled into the fixation passageway 721 to couple each of the first clamp portion 701, PCB 750, and second clamp portion 702 together in a sandwich/stacked fashion.

Figure 13:
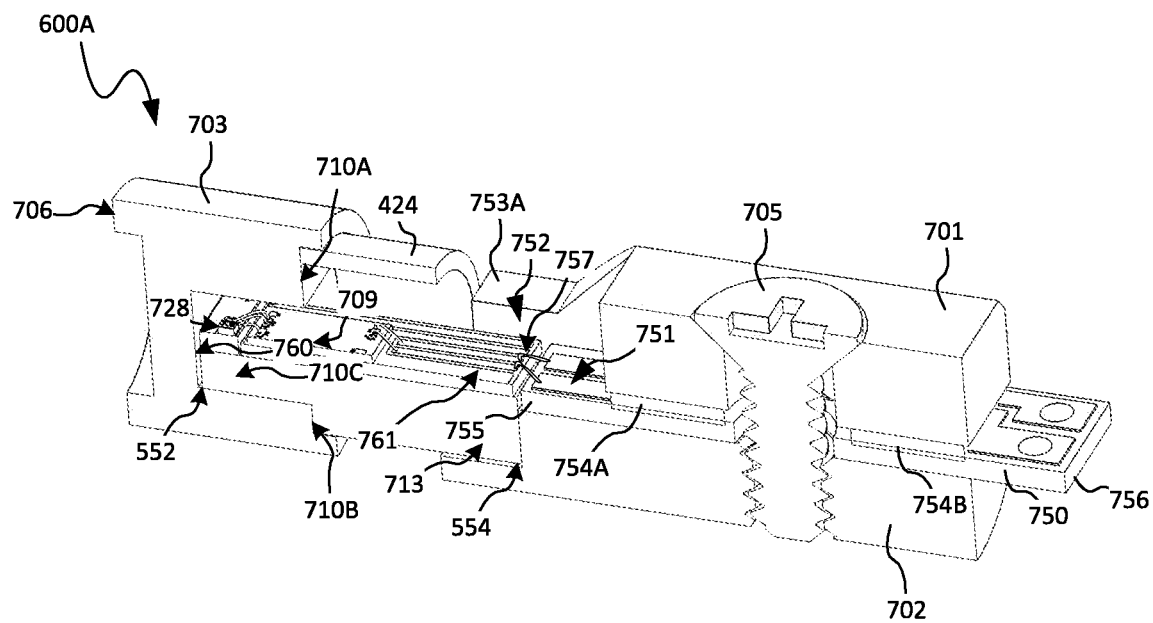
FIG. 13 shows a cross-sectional view of the example welding assembly of FIG. 11 in accordance with an embodiment of the present disclosure.

FIG. 13, with additional reference to FIGS. 11 and 12, shows a cross-sectional view of the welding assembly 600A taken along the line 3-3 of FIG. 11, in accordance with an embodiment of the present disclosure. As shown, the TOSA module 424 may be coupled to the first and second clamp portions 701 and 702 via a frictional connection. For example, arms 753A and 753B of the first clamp portion 701 may supply a force sufficient to hold the TOSA module 424 in place when the first and second clamp portions 701 and 702 are coupled together, e.g., via fixation member 705.

As further shown, the alignment member 703 includes a female tapered receptacle 709, or a TOSA module receptacle 709, which includes a shape that generally corresponds with an optical coupling end 552 of the TOSA module 424. The female tapered receptacle 709 is defined by at least a first recessed region 710A and a second recessed region 710B. The female tapered region may further be defined by a third tapered region 710C. The emission face 728 of a laser diode of the TOSA module 424 may be substantially parallel with a surface 760 that defines a portion of the third tapered region 710C. The surface 760 may be substantially parallel with the alignment contact surface 706. The body portion 715 may further define a tapered region 713, or TOSA module receptacle 713, which includes a shape that generally corresponds with the shape of an electrical coupling end 554 of the TOSA module 424.

The traces 751 of the PCB 750 may be electrically coupled to electrical traces 761 of the TOSA module 424 via, for example, wire bonds 757 or other suitable approaches. The wire bonds 757 may be removed after an active alignment process completes in order to electrically couple the TOSA module 424 to a flexible printed circuit board within an optical transceiver system, for example.

Additional Example Embodiments

Consistent with an aspect of the present disclosure a system for coupling a transceiver optical subassembly (TOSA) module to an associated subassembly housing is disclosed. The system including a first clamp portion having a plurality of walls that define a first tapered region and a mating surface, the mating surface extending along a longitudinal axis of the first clamp portion from a first end to a second end of the first clamp portion and being configured to couple to a second clamp portion and, a second clamp portion having a plurality of walls that define a second tapered region and a mating surface configured to couple to the mating surface of the first clamp portion, and wherein the first and second tapered regions of the first and second clamp portions, respectively, collectively form at least a portion of a TOSA module receptacle when the first and second clamp portions are coupled to each other, the TOSA module receptacle configured to securely hold the TOSA module at a fixed position.

In accordance with another aspect of the present disclosure a system for coupling a transceiver optical subassembly (TOSA) module to an associated subassembly housing is disclosed. The system comprising a multi-part clamp body comprising a first clamp portion having a plurality of walls that define a first tapered region and a mating surface, the mating surface extending along a longitudinal axis of the first clamp portion from a first end to a second end and being configured to couple to a second clamp portion and, a second clamp portion having a plurality of walls that define a second tapered region and a mating surface configured to couple to the mating surface of the first clamp portion, a TOSA module receptacle defined at least in part by the first and second clamp portions for receiving and coupling to an electrical coupling end of the TOSA module, and a printed circuit board (PCB) coupled between the first and second clamp portions, an alignment member having a recess with a shape that corresponds with an optical coupling end of the TOSA module, the alignment member further comprising an alignment contact surface for contacting a surface of the associated subassembly housing to mechanically align an emission face of the TOSA module substantially in parallel with the surface of the associated subassembly housing.

In accordance with another aspect a method for coupling a transceiver optical subassembly (TOSA) module to an associated subassembly housing is disclosed. The method including coupling an electrical coupling end of the TOSA module between a first and second clamp portion, the first and second clamp portions forming a clamp body when coupled to each other, coupling the clamp body into a mechanical grabber, coupling an alignment member to an optical coupling end of the TOSA module, the alignment member providing an alignment contact surface that extends substantially parallel with an emission face of the TOSA module; and moving the mechanical grabber along an axis towards a surface of the associated subassembly housing until the alignment contact surface directly contacts the surface of the associated subassembly housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A system for coupling a transceiver optical subassembly (TOSA) module to an associated subassembly housing:
    a first clamp portion having a plurality of walls that define a first tapered region and a mating surface, the mating surface extending along a longitudinal axis of the first clamp portion from a first end to a second end of the first clamp portion and being configured to couple to a second clamp portion;
    a second clamp portion having a plurality of walls that define a second tapered region and a mating surface configured to couple to the mating surface of the first clamp portion;
    wherein the first and second tapered regions of the first and second clamp portions, respectively, collectively form at least a portion of a TOSA module receptacle when the first and second clamp portions are coupled to each other, the TOSA module receptacle configured to securely hold the TOSA module at a fixed position; and
    wherein the first clamp portion includes a plurality of passageways extending there through to receive temporary electrical connection members, the plurality of passageways extending substantially transverse relative to the longitudinal axis of the first clamp portion.

2. The system of claim 1, further comprising an alignment member having a recess with a shape that corresponds with an optical coupling end of the TOSA module, the alignment member further comprising an alignment contact surface for contacting a surface of the associated subassembly housing to mechanically align an emission face of the TOSA module substantially in parallel with the surface of the associated subassembly housing.

3. The system of claim 1, wherein the TOSA module receptacle includes a female tapered recess to receive an electrical coupling end of the TOSA module.

4. The system of claim 1, further comprising the plurality of temporary electrical connection members, each of the plurality of temporary electrical connection members being disposed in a respective passageway of the plurality of passageways and having a first end to electrically couple to the TOSA module and a second end extending from the first clamp portion to electrically couple to associated driver circuitry.

5. The system of claim 4, wherein the temporary electrical connection members comprise spring-loaded pogo pins.

6. The system of claim 1, further comprising a printed circuit board (PCB) for coupling between the first and second clamp portions.

7. The system of claim 6, wherein the first tapered region includes first and second arm portions that extend along the longitudinal axis of the first clamp portion and form an opening therebetween, and wherein the opening is configured to expose a portion of the PCB when the PCB is coupled between the first and second clamp portions.

8. The system of claim 7, wherein a portion of the PCB exposed by the opening is configured to be wire bonded to an electrical coupling end of the TOSA module when the TOSA module is disposed in the TOSA module receptacle.

9. The system of claim 6, further comprising at least one electrical insulation member configured to be coupled between the PCB and the first clamp portion to provide electrical isolation therebetween.

10. The system of claim 1, wherein a fixation passageway extends through each of the first and second clamp portions and is configured to receive a fixation member to couple the first and second clamp portions together.

11. The system of claim 10, wherein the fixation passageway is configured to receive a fixation member.

12. The system of claim 11, wherein the fixation member comprises a screw.

13. A system for coupling a transceiver optical subassembly (TOSA) module to an associated subassembly housing:
    a multi-part clamp body comprising:
        a first clamp portion having a plurality of walls that define a first tapered region and a mating surface, the mating surface extending along a longitudinal axis of the first clamp portion from a first end to a second end and being configured to couple to a second clamp portion;
        a second clamp portion having a plurality of walls that define a second tapered region and a mating surface configured to couple to the mating surface of the first clamp portion;
        a TOSA module receptacle defined at least in part by the first and second clamp portions for receiving and coupling to an electrical coupling end of the TOSA module;
        a printed circuit board (PCB) coupled between the first and second clamp portions;
        wherein the first clamp portion includes a plurality of passageways extending there through to receive temporary electrical connection members; and
        the plurality of temporary electrical connection members, each of the plurality of temporary electrical connection members being disposed in a respective passageway of the plurality of passageways and having a first end to electrically couple to the TOSA module and a second end extending from the first clamp portion to electrically couple to associated driver circuitry;
    an alignment member having a recess with a shape that corresponds with an optical coupling end of the TOSA module, the alignment member further comprising an alignment contact surface for contacting a surface of the associated subassembly housing to mechanically align an emission face of the TOSA module substantially in parallel with the surface of the associated subassembly housing.

14. The system of claim 13, wherein the multi-part clamp body portion further defines a tapered wall for coupling to a mechanical grabber.

15. The system of claim 13, further comprising the TOSA module, and wherein the TOSA module is wire bonded to one or more electrical traces of the PCB.

* * * * *